(12) United States Patent
Sakamoto et al.

(10) Patent No.: US 7,362,370 B2
(45) Date of Patent: Apr. 22, 2008

(54) IMAGE CAPTURING APPARATUS, IMAGE CAPTURING METHOD, AND COMPUTER-READABLE MEDIUM STORING PROGRAM USING A DISTANCE MEASURE FOR IMAGE CORRECTION

(75) Inventors: Koichi Sakamoto, Saitama (JP); Hiroshi Fukuda, Saitama (JP); Atsuhiko Ishihara, Saitama (JP)

(73) Assignee: Fujifilm Corporation, Tokyo (JP)

( * ) Notice: Subject to any disclaimer, the term of this patent is extended or adjusted under 35 U.S.C. 154(b) by 843 days.

(21) Appl. No.: 10/331,488

(22) Filed: Dec. 31, 2002

(65) Prior Publication Data

US 2003/0137597 A1 Jul. 24, 2003

(30) Foreign Application Priority Data

Jan. 22, 2002 (JP) ............................. 2002-013506

(51) Int. Cl.
*H04N 5/222* (2006.01)
*H04N 5/238* (2006.01)

(52) U.S. Cl. ...................................... 348/371; 348/365
(58) Field of Classification Search ................ 348/371, 348/370, 255, 256, 251, 254, 364, 365, 353
See application file for complete search history.

(56) References Cited

U.S. PATENT DOCUMENTS 4,935,616 A * 6/1990 Scott ..................... 250/214 VT
5,023,647 A * 6/1991 Shiomi et al. ................ 396/89
5,970,261 A * 10/1999 Ishiguro et al. ............... 396/85
6,035,135 A * 3/2000 Okamura ...................... 396/61
6,069,659 A * 5/2000 Nakajima .................... 348/371
6,721,465 B1 * 4/2004 Nakashima et al. ........ 382/318

FOREIGN PATENT DOCUMENTS

| GB | 2294114 A | * | 4/1996 |
| JP | 01144179 A | * | 6/1989 |
| JP | 11-261797 A | | 9/1999 |
| JP | 11-261822 A | | 9/1999 |
| JP | 2000-278598 A | | 10/2000 |
| JP | 2000-307939 A | | 11/2000 |
| JP | 2001-92955 A | | 4/2001 |

* cited by examiner

*Primary Examiner*—Ngoc-Yen Vu
*Assistant Examiner*—Adam L. Henderson
(74) *Attorney, Agent, or Firm*—Birch, Stewart, Kolasch & Birch, LLP

(57) ABSTRACT

An image capturing apparatus, an image capturing method, and a computer-readable medium storing program for correcting appropriately an image for each area independently. A digital camera for capturing a subject includes an image pick-up unit for capturing a first image of the subject using an electric flash flashing at a first flash intensity, and a second image of the subject using the electric flash flashing at a second flash intensity; a distance judging unit for judging distance to a first partial subject out of the subject based on the first image and the second image; and an image correction unit for correcting a first partial image of the first partial subject, which is a part of the first image based on the distance to the first partial subject judged by the distance judging unit.

10 Claims, 7 Drawing Sheets

| SUBJECT DISTANCE | GAMMA VALUE | NOISE REDUCTION LEVEL | BRIGHTNESS CORRECTION LEVEL |
|---|---|---|---|
| SHORT | LOW | LOW | LOW |
| MEDIUM | MEDIUM | MEDIUM | MEDIUM |
| LONG | HIGH | HIGH | HIGH |

FIG. 4

IMAGE CAPTURING APPARATUS, IMAGE CAPTURING METHOD, AND COMPUTER-READABLE MEDIUM STORING PROGRAM USING A DISTANCE MEASURE FOR IMAGE CORRECTION

This patent application claims priority from a Japanese patent application, 2002-013506 filed on Jan. 22 2002, the contents of which are incorporated herein by reference.

BACKGROUND OF THE INVENTION

1. Field of the Invention

The present invention relates to an image capturing apparatus, an image capturing method, and a computer-readable medium storing program. More particularly, the present invention relates to an image capturing apparatus with an electric flash for capturing a subject and correcting the captured image.

2. Description of Related Art

Conventionally, when an image capturing apparatus, such as a digital camera captures a subject located at a long distance, image quality degradation, such as noise, blur or over/underexposure, tends to occur. A Japanese patent application publication No. 11-261797 discloses an image processing method for generating image data, which captures a single scene for multiple times with different focal length and superimposes the plurality of captured images so that the plurality of subjects, which are located at different distance, are captured in focus. Also, a Japanese patent application publication No. 11-261822 discloses an image processing method for reducing degradation of image quality, which is caused by lack of marginal illumination, by detecting density difference of each area of the acquired image, and performing density correction in accordance with the increasing/decreasing gradient of the density from a central area of the image to a marginal area of the image.

However, the image processing method disclosed in the Japanese patent application publication No. 11-261797 has a problem that it requires an expensive image capturing apparatus equipped with a multi-focus system. Moreover, the image processing method disclosed in the Japanese patent application publication No. 11-261822 corrects only the increasing/decreasing gradient of the density from the central area to the marginal area of the image, and the method is not capable of correcting degradation of the image that exists in the central area of the image.

SUMMARY OF THE INVENTION

Therefore, it is an object of the present invention to provide an image capturing apparatus, an image capturing method and a computer-readable medium storing program which can solve the foregoing problem. The above and other objects can be achieved by combinations described in the independent claims. The dependent claims define further advantageous and exemplary combinations of the present invention.

According to the first aspect of the present invention, there is provided an image capturing apparatus with an electric flash for capturing a subject. The image capturing apparatus includes an image pick-up unit for capturing a first image of the subject using the electric flash flashing at a first flash intensity, and for capturing a second image of the subject using the electric flash flashing at a second flash intensity; a distance judging unit for judging distance to a first partial subject out of the subject based on the first image and the second image; and an image correction unit for correcting a first partial image of the first partial subject, which is a part of the first image, based on the distance to the first partial subject judged by the distance judging unit.

The image correction unit may perform gamma correction on the first partial image using a gamma value based on the distance to the first partial subject.

The image correction unit may perform gamma correction on the first partial image using a first gamma value when the distance to the first partial subject is shorter than a predetermined value, and may perform gamma correction on the first partial image using a second gamma value, which is higher than the first gamma value, when the distance to the first partial subject is longer than a predetermined value.

The image correction unit may perform noise rejection on the first partial image at an intensity based on the distance to the first partial subject.

The image correction unit may perform noise rejection on the first partial image at a first intensity when the distance to the first partial subject is shorter than a predetermined value, and may perform noise rejection on the first partial image at a second intensity, which is higher than the first intensity, when the distance to the first subject is longer than a predetermined value.

The image correction unit may perform brightness correction on the first partial image at an intensity based on the distance to the first partial subject.

The image correction unit may perform brightness correction on the first partial image at a first intensity when the distance to the first subject is shorter than a predetermined value, and may perform brightness correction on the first partial image at a second intensity, which is higher than the first intensity, when the distance to the first subject is longer than a predetermined value.

The distance judging unit may further judge distance to a second partial subject out of the subject based on the first image and the second image, and the image correction unit may correct the second partial image of the second partial subject, which is a part of the first image, at a higher intensity than the first image when the distance to the second partial image is longer than the distance to the first partial image.

According to the second aspect of the present invention, there is provided an image capturing method for capturing a subject by an image capturing apparatus with an electric flash. The image capturing method includes steps of capturing a first image of the subject using the electric flash flashing at a first flash intensity; capturing a second image of the subject using the electric flash flashing at a second flash intensity; judging distance to a first partial subject out of the subject based on the first image and the second image; and correcting a first partial image of the first partial subject, which is a part of the first image, based on the distance to the first partial subject judged by the distance judging step.

According to the third aspect of the present invention, there is provided a computer readable medium storing thereon a program for an image capturing apparatus with an electric flash for capturing a subject. The program includes an image pick-up module for allowing the image capturing apparatus to capture a first image of the subject using the electric flash flashing at a first flash intensity, and a second image of the subject using the electric flash flashing at a second flash intensity; a distance judging module for allowing the image capturing apparatus to judge distance to a first partial subject out of the subject based on the first image and the second image; and an image correction unit for allowing the image capturing apparatus to correct a first partial image of the first partial subject, which is a part of the first image, based on the distance to the first partial subject judged by the distance judging unit.

The summary of the invention does not necessarily describe all necessary features of the present invention. The present invention may also be a sub-combination of the features described above.

BRIEF DESCRIPTION OF THE DRAWINGS

FIG. 4 is a reference table for the digital camera of the present embodiment correcting the image.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
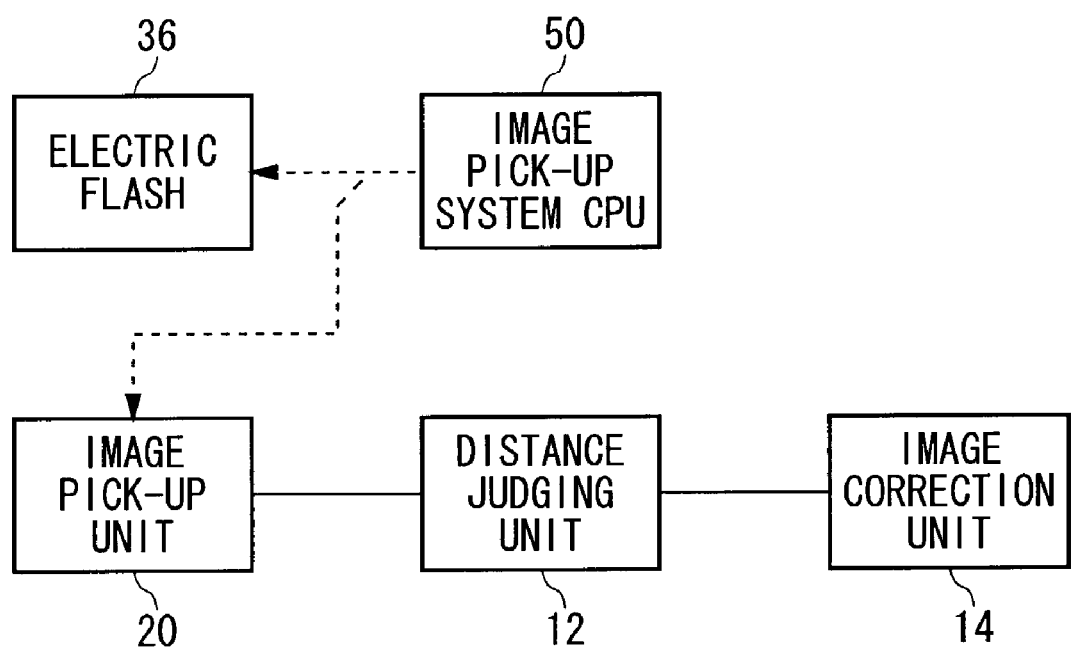
FIG. 1 is a block diagram showing a functional configuration of a digital camera according to an embodiment of the present invention.

FIG. 1 is a block diagram showing a functional configuration of a digital camera 10 according to an embodiment of the present invention. The digital camera 10 is an example of the image capturing apparatus of the present invention. The image capturing apparatus may be a digital camcorder which takes movies. The digital camera 10 includes an electric flash 36, an image pick-up unit 20 for capturing a subject, a distance judging unit 12 for judging a subject distance based on a plurality of images captured by the image pick-up unit 20, an image correction unit 14 for correcting the images based on the subject distance judged by the distance judging unit 12, and an image pick-up system CPU 50 for controlling operation of the electric flash 36 and the image pick-up unit 20. The electric flash 36 may be a part of the image pick-up unit 20.

When a user operates the digital camera 10, e.g., depression of a release switch, the image pick-up system CPU 50 confirms status of a scene position mode, which is selected from a portrait mode, a landscape mode, a night scene mode, etc., and detects brightness of a subject. Then the image pick-up system CPU 50 determines a first flash intensity and a second flash intensity of the electric flash 36 based on the scene position mode and the brightness of the subject. The image pick-up system CPU 50 determines operating condition of the image pick-up unit 20, such as shutter speed, aperture, zoom magnification, etc., based on the selected scene position mode and the detected brightness of the subject. Then the electric flash 36 flashes at the first flash intensity determined by the image pick-up system CPU 50. The image pick-up unit 20 captures a first image of the subject substantially synchronized with the flash of the electric flash 36 flashing at the first flash intensity. Next, the electric flash 36 flashes at the second flash intensity determined by the image pick-up system CPU 50. The image pick-up unit 20 captures a second image of the subject substantially synchronized with the flash of the electric flash 36 flashing at the second flash intensity. It is preferable that the subject is captured substantially in the same frame by minimizing a time interval between the capturing of the first image and the capturing of the second image.

The distance judging unit 12 judges the subject distance based on the first and second images captured by the image pick-up unit 20. Specifically, the distance judging unit 12 compares the brightness of the first image with the brightness of the second image, which are captured using the electric flash 36 flashing at different flash intensities from each other. When a brightness difference between the first image and the second image in a certain area is higher than a predetermined value, an image of the area is judged to be a partial image of a subject which the flash of the electric flash 36 reaches easily, i.e., a subject located at a short distance. When a brightness difference between the first image and the second image in a certain area is lower than a predetermined value, an image of the area is judged to be a partial image of a subject which the flash of the electric flash 36 does not reach easily, i.e., a subject located at a long distance.

The image correction unit 14 corrects the first image or the second image based on the subject distance judged by the distance judging unit 12. Specifically, the partial image of the partial subject judged to be located at a long distance and the partial image of the partial subject judged to be located at a short distance are corrected using different correction parameters respectively, where the partial images are parts of the first image.

According to the digital camera 10 described above, since image quality degradation caused by the subject distance is corrected using the optimal correction parameter for the partial subjects, the high definition image, on which the optimal correction is performed over the whole image, is obtainable.

Figure 2:
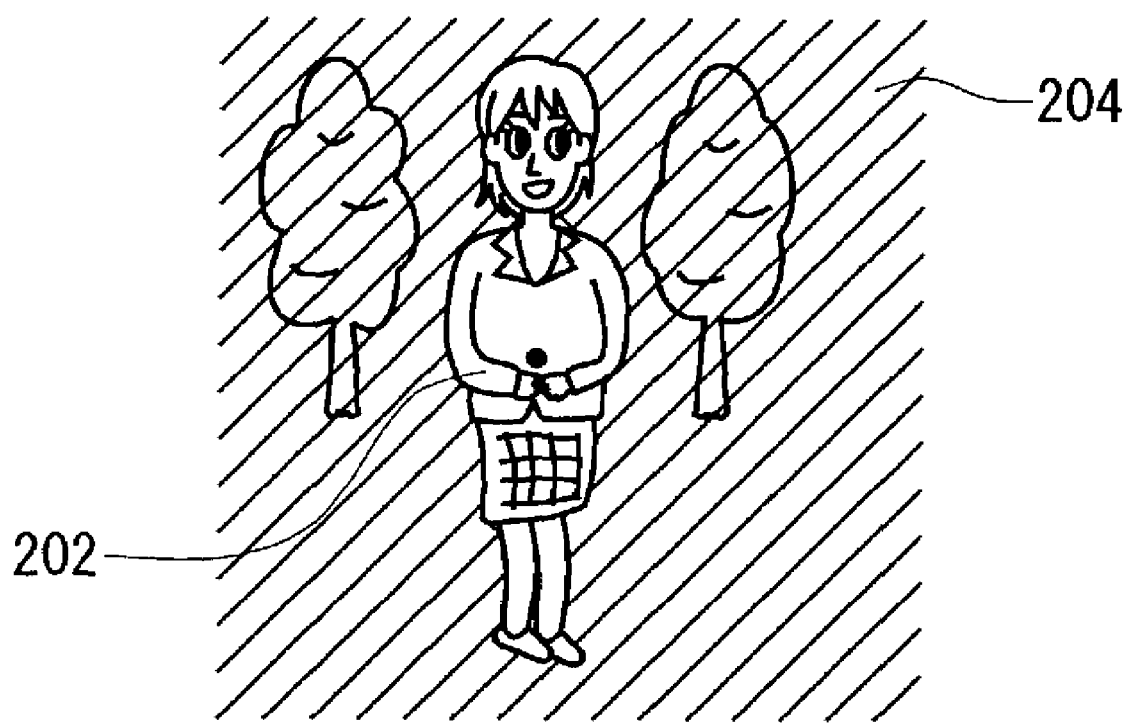
FIG. 2 shows a subject according to the present embodiment.

FIG. 2 shows a subject 200 according to the present embodiment. The subject 200 includes a partial subject 202 consisting of a person located at a short distance, and a partial subject 204 consisting of a background located farther than the partial subject 202.

Figure 3A:
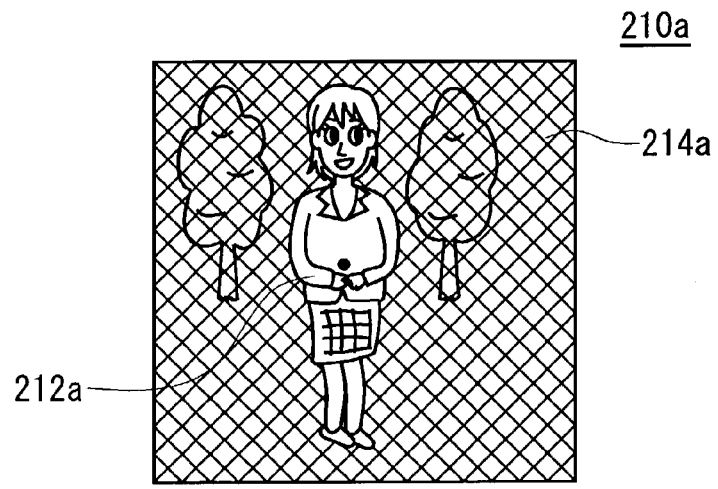
FIGS. 3A, 3B and 3C are images of the subject.
Figure 3B:
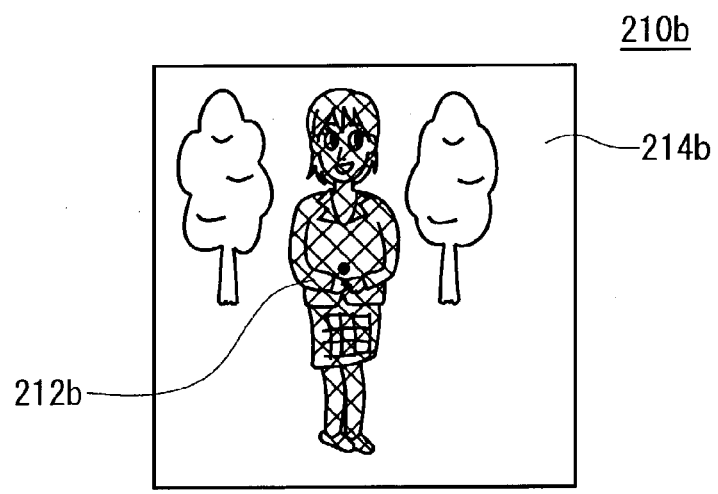
Figure 3C:
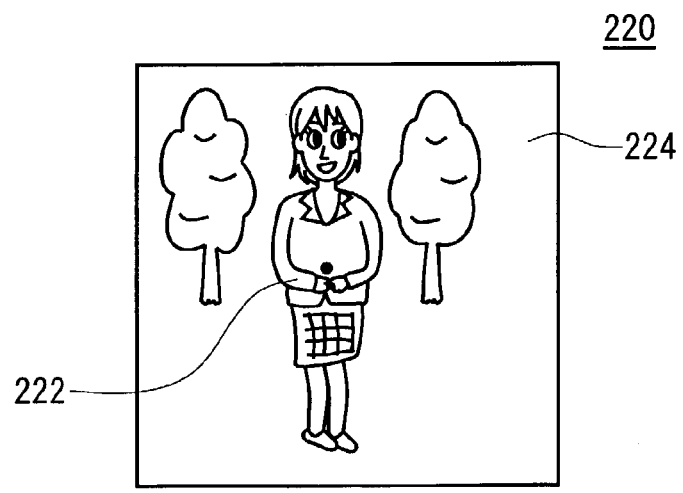

FIGS. 3A, 3B and 3C are images of the subject 200 captured by the digital camera 10. FIG. 3A is an original image 210a obtained by capturing the subject 200 using the electric flash 36 flashing at the first flash intensity. FIG. 3B is an original image 210b obtained by capturing the subject 200 using the electric flash 36 flashing at the second flash intensity, which is higher than the first flash intensity. The original images 210a and 210b are examples of the first and second images described above. FIG. 3C is the corrected image 220 generated by the image correction unit 14 correcting the original image 210a or 210b based on the subject distance judged by the distance judging unit 12 based on the original images 210a and 210b.

The original image 210a includes a partial image 212a of the partial subject 202 (refer to FIG. 2), and a partial image 214a of the partial subject 204 (refer to FIG. 2). The first flash intensity of the electric flash 36 for capturing the original image 210a may be a predetermined comparatively weak flash intensity, or may be a flash intensity which is determined by the image pick-up system CPU 50 so as to optimize exposure of the partial subject 202 (refer to FIG. 2). Since the partial subject 202 is located at a short distance, the partial image 212a is captured brightly by the flash of the electric flash 36. On the other hand, since the electric flash 36 does not reach easily the partial subject 204 (refer to FIG. 2) located farther than the partial subject 202 (refer to FIG. 2), brightness of the partial image 214a is lower than the brightness of the partial image 212a. In a case where quantity of light of whole of the subject 200 (refer to FIG. 2) is low, e.g., a subject in the twilight, a brightness difference between the partial images 212a and 214a tends to become high due to the flash of the electric flash 36. Consequently, lack of brightness and existence of noise on the partial image 214a are more conspicuous than on the partial image 212a.

On the other hand, the original image 210b includes a partial image 212b of the partial subject 202 (refer to FIG. 2), and a partial image 214b of the partial subject 204 (refer to FIG. 2). It is preferable that the second flash intensity of the electric flash 36 for capturing the original image 210b is much higher than the first flash intensity described above. When the electric flash 36 flashes at the second flash condition, since the partial subject 202 (refer to FIG. 2) located at a short distance reflects the flash of the electric flash 36 strongly, the partial image 212b tends to be overexposed, and brightness difference between the partial images 212a and 212b tends to become high. On the other hand, since the partial subject 204 (refer to FIG. 2) is located at a long distance, the flash of the electric flash 36 does not reach easily. Therefore, brightness difference between the partial images 214a and 214b is lower than the brightness difference between the partial images 212a and 212b.

When the original image 210a is compared with the original image 210b, which are captured in the manner described above, brightness difference between the partial images 212a and 212b, which are images of the partial subject 202 (refer to FIG. 2) located at a short distance, is high, while brightness difference between the partial images 214a and 214b, which are images of the partial subject 204 (refer to FIG. 2) located at a long distance, is low. This tendency is common among subjects having a certain reflectance. Therefore, the distance judging unit 12 judges subject distance for each area of the subject 200 (refer to FIG. 2) by making a comparison between brightness of the original images 210a and 210b. When the partial image 214a is dark, the image correction unit 14 estimates whether the darkness is caused by darkness of the partial subject 204 (refer to FIG. 2) itself, or by the partial subject 204 (refer to FIG. 2) being located at a long distance, by referring the distance to the partial subject 204 (referred to FIG. 2) judged by the distance judging unit 12. Moreover, when the partial image 214a includes a luminescent spot or a luminescent line, the image correction unit estimates whether the luminescent spot or line is originally included in the partial subject 204 (refer to FIG. 2), or it is an image quality degradation caused by the partial subject 204 (refer to FIG. 2) being located at a long distance.

Therefore, when the image correction unit 14 corrects the original image 210a or 210b, since the image correction unit 14 corrects the partial image 214a of the partial subject 204 the most, which is judged to be located at a long distance by the distance judging unit 12, the image correction unit 14 generates the corrected image 220 on which the image quality degradation resulting from the subject distance is corrected appropriately.

Specifically, the image correction performed by the image correction unit 14 is, for example, gamma correction, noise rejection and brightness correction. When the image correction unit 14 performs gamma correction on the partial image 214a or 214b, of which the brightness is low due to the long subject distance, it corrects steeper change in brightness on the partial image 214a or 214b, which is more than the change in brightness of the partial subject 204, by performing gamma correction with a higher gamma value than a predetermined gamma value. Moreover, when the image correction unit 14 performs the gamma correction on the partial image 212a or 212b, which is the image of the subject which the flash of the electric flash 36 reaches sufficiently, it corrects gentler change in brightness on the partial image 212a or 212b, which is less than the change in brightness of the partial subject 204, by performing gamma correction with a lower gamma value than a predetermined gamma value.

The image correction unit 14 also performs appropriate noise rejection optimized for each area on the original image 210a or 210b by performing noise rejection at higher level on the partial image 214a or 214b, where noise is conspicuous due to the long subject distance.

The image correction unit 14 also performs appropriate brightness correction optimized for each area on the original image 210a or 210b by performing brightness correction at higher level on the partial image 214a or 214b, where brightness is low due to the long subject distance.

FIG. 4 is an example of a reference table for the image correction unit 14 correcting an image. The digital camera 10 may classify the subject distance judged by the distance judging unit 12 into several levels, e.g., short distance, middle distance, and long distance. In this case, the reference table includes gamma values, noise rejection levels and brightness correction levels corresponding to each of the classified subject distances. Each correction level may also include a plurality of parameters which determine effect of the image correction. By including such a reference table, the image correction unit 14 acquires correction parameters based on the subject distance easily.

Figure 5:
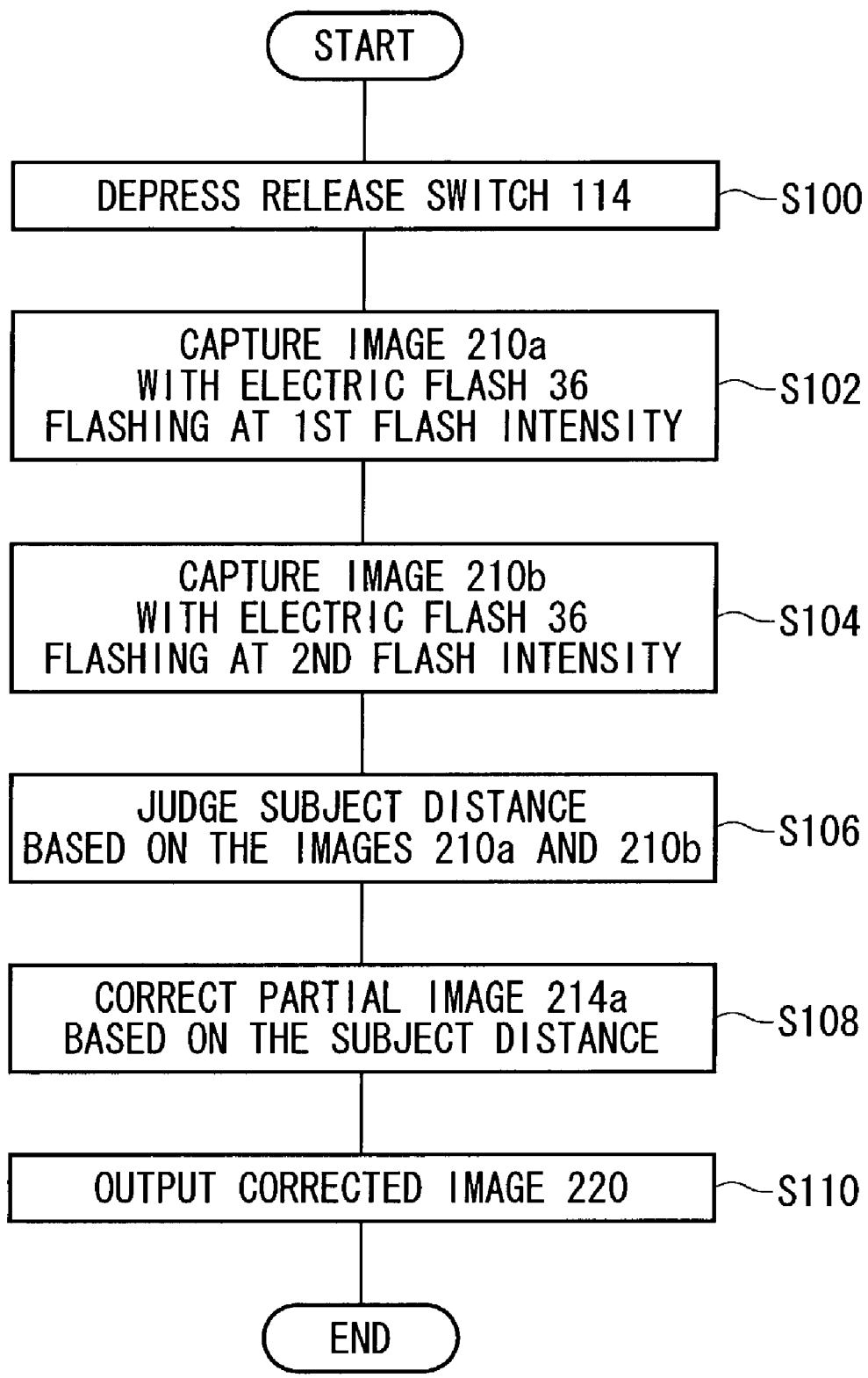
FIG. 5 is a flow chart showing an example of operation of the digital camera according to the present embodiment.

FIG. 5 is an example of a flow chart showing an operation of the digital camera 10 capturing the subject 200. When it is ready for photographing, a user depresses a release switch 114 (S100). According to the depression of the release switch 114, the digital camera 10 captures the original image 210a using the electric flash 36 flashing at the first flash intensity (S102) Next, the digital camera 10 captures the original image 210b using the electric flash 36 flashing at the second flash intensity (S104). Next, the distance judging unit 12 judges distance to the partial subject 204 based on the original images 210a and 210b (S106). Next, the image correction unit 14 corrects the partial image 214a based on the distance to the partial subject 204 judged by the distance judging unit 12 (S108). Finally, the image correction unit 14 outputs the image obtained in S108 as the corrected image 220 (S110). The sequential function flow is ended hereinbefore.

Figure 6:
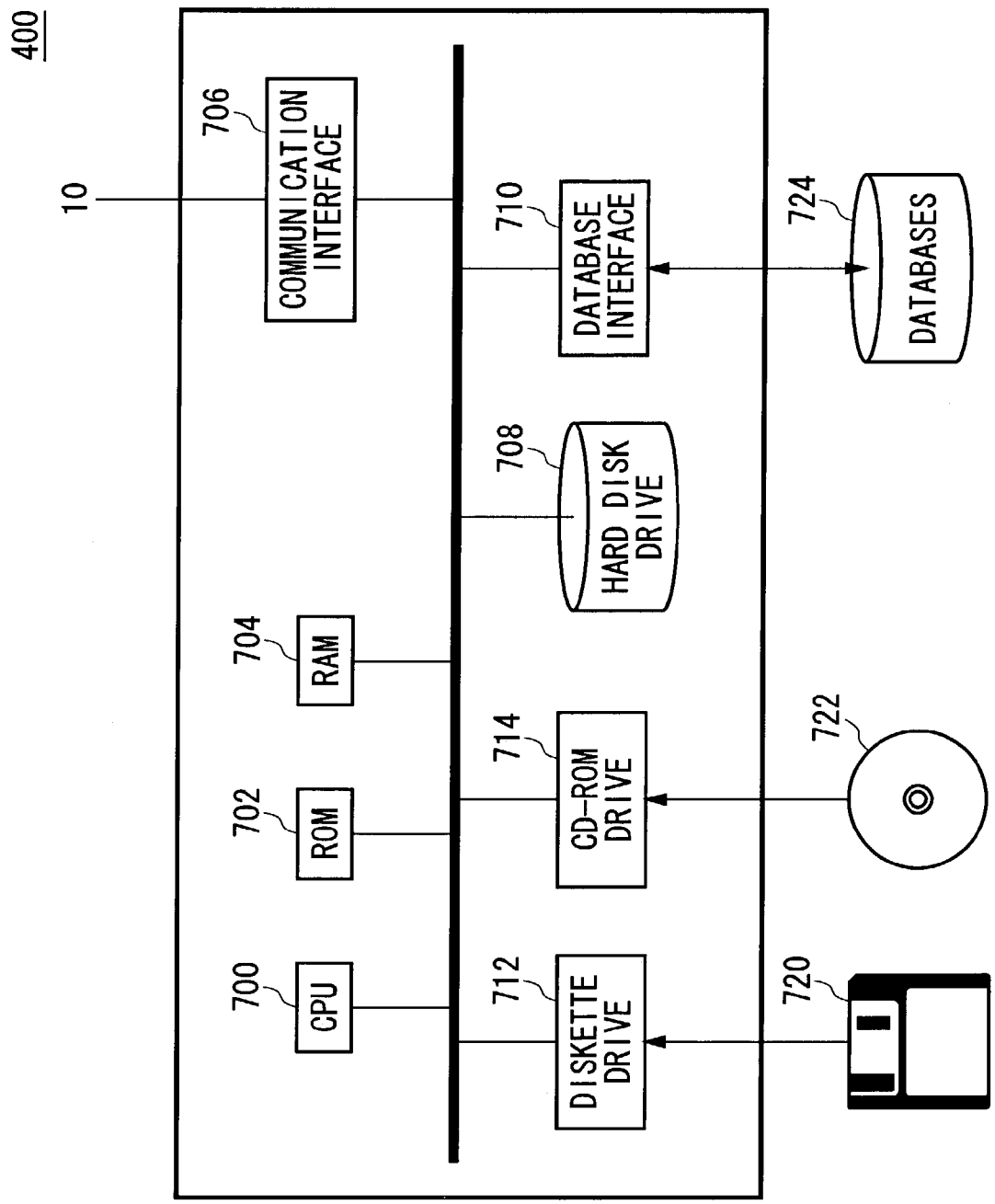
FIG. 6 is a block diagram showing an example of a hardware configuration of a personal computer according to the present embodiment.

FIG. 6 is a block diagram showing a hardware configuration of a personal computer 400 according to the present embodiment. The personal computer 400 connects with the digital camera 10 and installs program and/or data to the digital camera 10, and acquires image data and/or audio data from the digital camera 10. The personal computer 400 includes CPU 700, ROM 702, RAM 704, a communication interface 706, a hard disk drive 708, a database interface 710, a diskette drive 712, and a CD-ROM drive 714. The CPU 700 operates based on a program stored in the ROM 702 and the RAM 704. The communication interface 706 communicates with the digital camera 10 through network. The database interface 710 writes data in a database, and updates the contents of the database. The hard disk drive

708, as an example of a storage device, stores setting information and program executed in the CPU 700.

The diskette drive 712 reads data or a program from a diskette 720, and provides the data or the program to the CPU 700 and the communication interface 706. The CD-ROM drive 714 reads data or a program from CD-ROM 722, and provides the data or the program to the CPU 700 and the communication interface 706. The communication interface 706 transmits the data or the program provided by the diskette drive 712 or the CD-ROM drive 714 to the digital camera 10. The database interface 710 connects with various databases 724, and transmits and receives data to/from the databases 724.

The program, which is executed by the CPU 700 and supplied to the digital camera, is stored in a record medium such as the diskette 720 or the CD-ROM 722 and provided to a user. The program stored in the record medium may be either compressed or decompressed. The program executed by the CPU 700 is installed from the record medium to the hard disk drive 708, read by the RAM 704, and executed by the CPU 700. The program supplied to the digital camera is read from the record medium, installed in the digital camera 10 through the communication interface 706, and executed in the digital camera 10.

The program in the record medium, which is installed in the digital camera 10, includes an image pick-up module, a distance judging module, and an image correction module as a functional configuration. Since the function of the modules, by which the digital camera 10 is manipulated, is the same as the operation of the corresponding component in the digital camera 10 of the present embodiment, explanation of the function of the modules is omitted.

A part or all functions of the operation of the digital camera 10 in all embodiments explained in this patent application are storable in the diskette 720 or the CD-ROM 722, which are examples of the record media depicted in FIG. 6.

These programs may be read by the RAM from the record medium and be executed, or may be executed after the programs are installed in the RAM. The programs may be stored either on a single record medium or a plurality of record media. The programs may be stored in an encoded form.

It is possible to use an optical record medium such as DVD or PD, a magneto-optical record medium such as Minidisk, a tape medium, a magnetic record medium or a semiconductor memory such as an IC card or a Miniature Card as a record medium instead of the diskette or the CD-ROM. A storage device, such as a hard disk or RAM in a server system on a dedicated communication network or the Internet, may be used as a record medium and the program may be provided to the digital camera 10 via the communication network.

Figure 7:
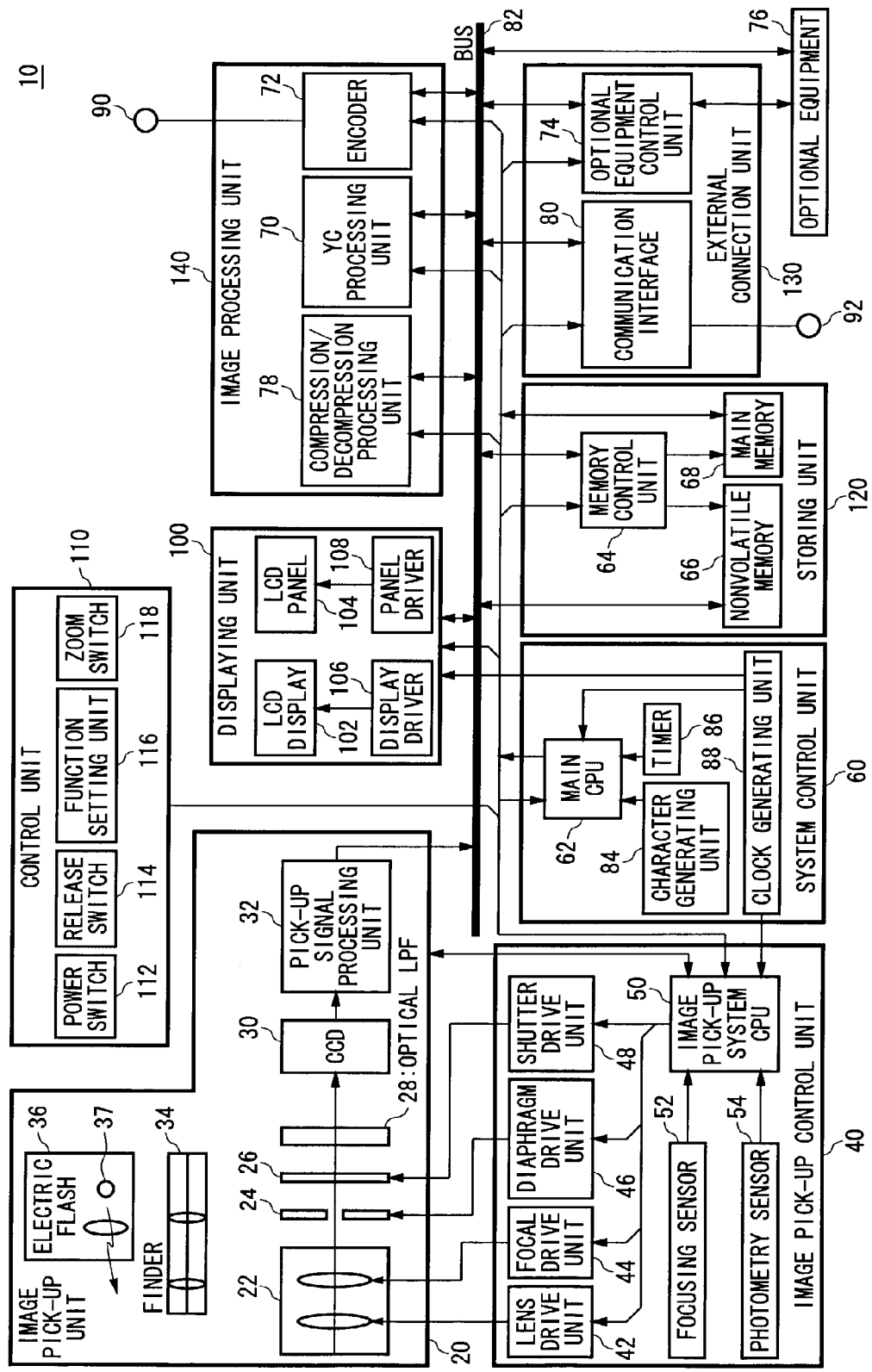
FIG. 7 is a block diagram showing an example of a detailed configuration of the digital camera according to the present embodiment.

FIG. 7 is a block diagram showing an example of a configuration of the digital camera 10 according to the present embodiment. The digital camera 10 includes the image pick-up unit 20, an image pick-up control unit 40, a system control unit 60, a displaying unit 100, a control unit 110, the storing unit 120, an external connection unit 130 and the image processing unit 140. The image processing unit 140 is an example of the distance judging unit 12 and the image correction unit 14.

The image pick-up unit 20 includes a taking-lens unit 22, a diaphragm 24, a shutter 26, optical LPF 28 (low pass filter), the CCD 30 (charge-coupled device), the pick-up signal processing unit 32, a finder 34, and the electric flash 36.

The taking-lens unit 22 takes and processes a subject image. The taking-lens unit 22 includes a focal lens, a zoom lens, etc., and forms the image of the subject onto surface of the CCD 30. The diaphragm 24 limits the light which passes the taking-lens unit 22, and the optical LPF 28 passes light having longer wavelength component than a predetermined wavelength. Each of the photo detectors 300 included in the CCD 30 stores charge according to quantity of light of the formed subject image (the charge is referred to as "stored charge" hereinafter).

The shutter 26 is a mechanical shutter and controls whether to form the image of the light onto the CCD 30, the light passing the taking-lens unit 22. The digital camera 10 may include an electronic shutter function instead of the mechanical shutter 26. In order to realize the electronic shutter function, each of the photo detectors 300 of the CCD 30 has a shutter gate and a shutter drain. The stored charge is discharged to the shutter drain by turning on the shutter gate. Duration of storing the charge to each of the photo detectors 300, i.e., shutter speed, is controllable by controlling the shutter gate. In the CCD 30, the stored charge is read by a shift register by applying a readout gate pulse, and is read sequentially as a voltage signal by applying the register transfer pulse.

The pick-up signal processing unit 32 separates the voltage signal indicating the subject image outputted from the CCD 30, i.e., an analog signal, into R, G, and B components. The pick-up signal processing unit 32 adjusts white balance of the subject image by adjusting R, G, and B components. The pick-up signal processing unit 32 performs gamma correction of the subject image. The pick-up signal processing unit 32 converts the analog signal, which is separated into R, G, and B components, to a digital signal, and image data of the digital signal of the subject image (referred to as "digital image data" hereinafter), obtained by the A/D conversion, is outputted to the system control unit 60.

The finder 34 may have a displaying means and may display various information from below-mentioned main CPU 62, etc. The electric flash 36 includes a discharge tube 37, which discharges energy stored in a capacitor, and when the energy is supplied to the discharge tube 37, the electric flash 36 functions by the discharge tube 37 emitting light.

The image pick-up control unit 40 includes a lens drive unit 42, a focal drive unit 44, a diaphragm drive unit 46, a shutter drive unit 48, an image pick-up system CPU 50 which controls the drive units above, a focusing sensor 52, and the photometry sensor 54. The lens drive unit 42, the focal drive unit 44, the diaphragm drive unit 46, and the shutter drive unit 48 include driving means, such as a stepping motor, and drive mechanical components in the image pick-up unit 20. According to depression of the release switch 114, the focusing sensor 52 measures distance to the subject, and the photometry sensor 54 measures brightness of the subject. The focusing sensor 52 and the photometry sensor 54 supply focusing data and photometry data to the image pick-up system CPU 50, where the focusing data means the data of the measured distance to the subject, and the photometry data means the data of the measured brightness of the subject.

The image pick-up system CPU 50 controls the lens drive unit 42 and the focal drive unit 44, and adjusts a zoom magnification and a focus of the taking-lens 22 based on photography information, such as a zoom magnification directed by a user. Alternatively, the image pick-up system CPU 50 may control the lens drive unit 42 and the focal drive unit 44, and may adjust a zoom magnification and a focus based on the focusing data received from the focusing sensor 52.

The image pick-up system CPU 50 determines stop and shutter speed based on the photometry data received from the photometry sensor 54. The diaphragm drive unit 46 and the shutter drive unit 48 control the aperture size of the diaphragm 24, and the opening and closing of the shutter 26 in accordance with the determined value.

The image pick-up system CPU 50 controls light emission of the electric flash 36 based on the photometry data received from the photometry sensor 54, and adjusts the aperture size of the diaphragm 26 simultaneously. When the user instructs to take an image, the CCD 30 starts to store the charge and outputs the stored charge to the pick-up signal processing unit 32 after the shutter time calculated from the photometry data is elapsed.

The system control unit 60 includes main CPU 62, a character generating unit 84, a timer 86, and a clock generating unit 88. The main CPU 62 controls whole parts of the digital camera 10, especially the system control unit 60. The main CPU 62 sends and receives required information to/from the image pick-up systems CPU 50 by serial communication or the like.

The clock generating unit 88 generates an internal clock of the main CPU 62, and supplies it to the main CPU 62. The clock generating unit 88 also generates internal clocks of the image pick-up system CPU 50 and the displaying unit 100. The clock generating unit 88 may supply the clocks having different frequencies to the main CPU 62, the image pick-up system CPU 50, and the displaying unit 100, respectively.

The character generating unit 84 generates text and graphic information, which is superimposed onto the captured image, such as date/time or a title of the image. A timer, 86 has backing of battery etc., counts time always, and supplies time information, such as information about the captured date/time of the captured image, to the main CPU 62 based on the counted value. It is preferable that the power is supplied to the timer 86 from the battery so as to count time even when main power supply of the digital camera is switched off. It is also preferable that the character generating unit 84 and the timer 86 are annexed to the main CPU 62.

The storing unit 120 includes a memory control unit 64, nonvolatile memory 66, and main memory 68. The memory control unit 64 controls the nonvolatile memory 66 and the main memory 68. The nonvolatile memory 66 is composed of EEPROM (electrically erasable programmable read only memory) or flash memories etc., and stores it with data which is to be held even when the power supply of the digital camera 10 is switched off, such as setting information set by a user or a factory preset value. The nonvolatile memory 66 may store a boot program, a system program, etc. of the main CPU 62.

It is preferable that the main memory 68 is composed of memory which is relatively inexpensive and has large capacity, like DRAM. The main memory 68 has a function as frame memory to store the data outputted from the image pick-up unit 20, a function as system memory which loads various programs, and a function as a work area. The nonvolatile memory 66 and the main memory 68 communicate with each part inside/outside the system control unit 60 through a bus 82. The nonvolatile memory 66 may further store the digital image data.

The image processing unit 140 includes an YC processing unit 70, an encoder 72, and a compression/decompression processing unit 78. The external connection unit 130 includes an optional equipment control unit 74 and a communication interface 80.

The YC processing unit 70 performs YC conversion to the digital image data, and generates a luminance signal Y, a color difference signals B-Y and R-Y. The main memory 68 stores the luminance signal and the color difference signals based on control of the memory control unit 64.

The compression/decompression processing unit 78 reads the luminance signal and the color difference signals sequentially from the main memory 68, and compresses them. Then the optional equipment control unit 74 writes the compressed digital image data (referred to as "compressed data") in a memory card which is an example of the optional equipment 76.

The encoder 72 converts the luminance signal and the color difference signals into a video signal (such as NTSC or PAL signal), and outputs the video signal from a terminal 90. When generating the video signal from the compressed data recorded on the optional equipment 76, the compressed data is supplied to the compression/decompression processing unit 78 at first through the optional equipment control unit 74. Then, the data is decompressed in the compression/decompression processing unit 78 and the encoder 72 converts the decompressed data into the video signal.

The optional equipment control unit 74 performs generation, logical conversion, and/or voltage conversion of the signal that flows between the bus 82 and the optional equipment 76, in order to conform the signal to the specification of the optional equipment 76 and the bus 82. Other than the above-mentioned memory card, the digital camera 10 may support a standard PCMCIA I/O card, for example, as the optional equipment 76. In this case, the optional equipment control unit 74 may be composed of bus control LSI for PCMCIA standard or the like.

The communication interface 80 performs control such as protocol conversion to comply with the communication specification supported by the digital camera 10, e.g., USB, RS-232C, Ethernet, etc. The communication interface 80 may output the compressed data or the digital image data to external equipment or to a network through a terminal 92. The communication interface 80 includes a driver IC if necessary and communicates with external equipment through the terminal 92. The communication interface 80 may be adapted to communicate with the external equipment, such as a printer, a Karaoke machine or a video game machine, through an original standard interface.

The displaying unit 100 includes an LCD display 102, an LCD panel 104, a display driver 106, and a panel driver 108. The display driver 106 controls the LCD display 102. The panel driver 108 controls the LCD panel 104. The LCD display 102 is positioned on the back face of the camera, of which the size is about 2 inches for example, and displays an image currently captured, a playback image, zoom magnification of the captured or playback image, remaining battery charge, date/time, mode selection screen, a subject image, etc. The LCD panel 104 is a monochrome LCD, for example, is positioned on top face of the camera, and displays information, such as quality of the image (fine, normal, basic, etc.), flash mode (forced flash, suppressed flash, etc), number of available frames, number of pixels, and remaining battery charge.

The control unit 110 includes a power switch 112, the release switch 114, a function setting unit 116, and a zoom switch 118. The power switch 112 switches the digital camera 10 on and off based on direction of a user. The release switch 114 can be depressed in two levels, i.e., halfway depression and full depression. For example, when the release switch 114 is depressed halfway, the image pick-up control unit 40 performs automatic focusing and automatic exposure, and the image pick-up unit 20 captures a subject image by depressing the release switch 114 fully.

The function setting unit 116 is, for example, a rotatable mode dial or a 4-direction button and accepts settings such as "file format", "special effect", "print", "determine/save", "change display ", etc. The zoom switch 118 accepts setting of zoom magnification of the subject image captured by the image pick-up unit 20.

The digital camera 10 having the above-mentioned structure operates in the following manner. First, the power switch 112 is depressed and power is supplied to each part of the digital camera 10. The main CPU 62 judges whether the digital camera 10 is in photography mode or in playback mode by reading status of the function setting unit 116.

When a digital camera 10 is in photography mode, the main CPU 62 supervises the depression status of the release switch 114. When the half-depression of the release switch 114 is detected, the image pick-up system CPU 50 acquires photometry data and focusing data from the photometry sensor 54 and the focusing sensor 52, respectively. The image pick-up control unit 40 adjusts focus and stop of the image pick-up unit 20, etc. based on the photometry data and the focusing data acquired by the image pick-up system CPU 50. After the adjustment, the LCD display 102 informs a user about the completion of the adjustment by displaying characters, such as "standby".

Then, the main CPU 62 supervises the depression status of the release switch 114. When the full-depression of the release switch 114 is detected, the shutter 26 is closed after a predetermined shutter time is elapsed and the stored charge of the CCD 30 is discharged to the pick-up signal processing unit 32. The digital image data, generated as a result of processing by the pick-up signal processing unit 32, is outputted to the bus 82. The digital image data is once stored in the main memory 68, then it is processed in the YC processing unit 70 and the compression/decompression processing unit 78, and is recorded in the optional equipment 76 via the optional equipment control unit 74. The captured image based on the recorded digital image data is displayed on the LCD display 102 for a while, so that a user can check the captured image. As described above, a sequence of the photographing operation is finished.

On the other hand, when the digital camera 10 is in playback mode, the main CPU 62 reads the captured image from the main memory 68, the nonvolatile memory 66, and/or the optional equipment 76, and displays the image on the LCD display 102 of the displaying unit 100.

In this state, when a user directs either "move forward" or "move backward" on the function setting unit 116, the main CPU 62 reads another captured image stored in the main memory 68, the nonvolatile memory 66, and/or the optional equipment 76, and displays the image on the LCD display 102 of the displaying unit 100.

As described above, the present invention provides the image capturing apparatus, the image capturing method, and the computer-readable medium storing program for appropriately correcting the obtained image for each area independently.

Although the present invention has been described by way of an exemplary embodiment, it should be understood that those skilled in the art might make many changes and substitutions without departing from the spirit and the scope of the present invention which is defined only by the appended claims.

What is claimed is:

1. An image capturing apparatus for capturing a subject, comprising:
    an electric flash;
    an image pick-up system CPU for detecting a brightness of the subject and for determining a first flash intensity and a second flash intensity of the electric flash based on the brightness of the subject;
    an image pick-up unit for capturing a first image of the subject when said electric flash flashes at the first flash intensity, and for capturing a second image of the subject when said electric flash flashes at the second flash intensity;
    a distance judging unit for judging a distance to a first partial subject of the subject based on the first image and the second image both captured by said image pick-up unit; and
    an image correction unit for correcting a first partial image of the first partial subject, based on said distance to the first partial subject judged by said distance judging units,
    wherein said distance judging unit judges the distance to the first partial subject of the subject based on a brightness difference between the first image and the second image both captured by said image pick-up unit.

2. The image capturing apparatus as claimed in claim 1, wherein said image correction unit performs gamma correction on the first partial image using a gamma value based on the distance to the first partial subject.

3. The image capturing apparatus as claimed in claim 1, wherein said image correction unit performs gamma correction on the first partial image using a first gamma value when the distance to the first partial subject is shorter than a predetermined value, and performs gamma correction on the first partial image using a second gamma value, which is higher than the first gamma value, when the distance to the first partial subject is longer than a predetermined value.

4. The image capturing apparatus as claimed in claim 1, wherein said image correction unit performs noise rejection on the first partial image at an intensity based on the distance to the first partial subject.

5. The image capturing apparatus as claimed in claim 1, wherein said image correction unit performs noise rejection on the first partial image at a first intensity when the distance to the first partial subject is shorter than a predetermined value, and performs noise rejection on the first partial image at a second intensity, which is higher than the first intensity, when the distance to the first subject is longer than a predetermined value.

6. The image capturing apparatus as claimed in claim 1, wherein said image correction unit performs brightness correction on the first partial image at an intensity based on the distance to the first partial subject.

7. The image capturing apparatus as claimed in claim 1, wherein said image correction unit performs brightness correction on the first partial image at a first intensity when the distance to the first subject is shorter than a predetermined value, and performs brightness correction on the first partial image at a second intensity, which is higher than the first intensity, when the distance to the first subject is longer than a predetermined value.

8. The image capturing apparatus as claimed in claim 1, wherein
    said distance judging unit further judges distance to a second partial subject out of the subject based on the first image and the second image, and said image correction unit corrects the second partial image of the second partial subject, which is a part of the first image, at a higher intensity than the first image when the distance to the second partial image is longer than the distance to the first partial image.

9. An image capturing method for capturing a subject by an image capturing apparatus with an electric flash, comprising steps of:

determining a brightness of the subject;

determining a first flash intensity and a second flash intensity of the electric flash based on the brightness of the subject;

capturing a first image of the subject when the electric flash flashes at the first flash intensity;

capturing a second image of the subject when the electric flash flashes at the second flash intensity;

judging a distance to a first partial subject of the subject based on the first image and the second image both captured by said image pick-up unit; and correcting a first partial image of the first partial subject, based on the distance to the first partial subject judged by said distance judging step, wherein said distance judging unit judges the distance to the first partial subject of the subject based on a brightness difference between the first image and the second image both captured by said image pick-up unit.

10. A computer readable medium storing thereon a program executed by a computer for an image capturing apparatus with an electric flash for capturing a subject, the program comprising:

an image pick-up system module for determining a brightness of the subject and for determining a first flash intensity and a second flash intensity of the electric flash based on the brightness of the subject;

an image pick-up module for allowing the image capturing apparatus to capture a first image of the subject when the electric flash flashes at the first flash intensity, and a second image of the subject when the electric flash flashes at the second flash intensity;

a distance judging module for operating the image capturing apparatus to judge a distance to a first partial subject of the subject based on the first image and the second image both captured by said image pick-up unit; and an image correction module for allowing the image capturing apparatus to correct a first partial image of the first partial subject, based on the distance to the first partial subject judged by said distance judging module, wherein said distance judging unit judges the distance to the first partial subject of the subject based on a brightness difference between the first image and the second image both captured by said image pick-up unit.

* * * * *